United States Patent [15] 3,673,962
Sagawa [45] July 4, 1972

[54] LITHOGRAPHIC DUPLICATING METHOD AND LITHOPLATE MASTER THEREFORE

[72] Inventor: Burt K. Sagawa, Bloomington, Minn.
[73] Assignee: Minnesota Mining and Manufacturing Company, St. Paul, Minn.

[22] Filed: Sept. 23, 1970
[21] Appl. No.: 74,889

[52] U.S. Cl. ...... 101/467, 96/33, 101/462
[51] Int. Cl. ...... G03f 7/02
[58] Field of Search ...... 96/33, 76; 101/467, 462, 450

[56] References Cited

UNITED STATES PATENTS

| | | | |
|---|---|---|---|
| 3,559,578 | 2/1971 | Haas | 101/450 |
| 3,094,619 | 6/1963 | Grant | 117/36.8 |
| 3,094,417 | 6/1963 | Workman | 96/76 |

*Primary Examiner*—Norman G. Torchin
*Assistant Examiner*—Edward C. Kimlin
*Attorney*—Kinney, Alexander, Sell, Steldt & Delahunt

[57] ABSTRACT

A high quality long run lithographic printing plate is produced by applying an alpha-naphthol first reactant at image areas to a lithoplate master containing as co-reactants for the alpha-naphthol both ionic iodide compound and ionic chromium compound, and heating the plate.

20 Claims, No Drawings

LITHOGRAPHIC DUPLICATING METHOD AND LITHOPLATE MASTER THEREFORE

BACKGROUND OF THE INVENTION

This invention relates to the art of duplicating and more particularly to materials and methods useful in the planographic or lithographic printing art.

The duplicating of graphic matter by lithography normally involves the creation on a preferentially hydrophilic surface of preferentially oleophilic ink-receptive ink image areas corresponding to the image-defining areas of the original. An oily ink is selectively taken up by the image areas while the non-image areas are maintained in a water-wet and ink-repellent state. The ink is then transferred under pressure either directly or by way of an intermediate transfer surface, to the surface of the paper or other print sheet.

One method of forming ink receptive image areas on a lithoplate has been the utilization of chromium compounds in conjunction with resins such as polyvinyl alcohol wherein the chromium compounds, when struck by light, cause the resin to become insoluble and resist washing off the plate, the insoluble resin being ink receptive to provide a negative copying master.

Various methods have been devised for forming images on receptor sheets. For example, transfer of reactant materials from an exposed light-sensitive intermediate sheet to a receptor sheet containing an image-forming co-reactant has previously been suggested, e.g., in U.S. Pat. Nos. 3,094,417; 3,094,619. Under reflex exposure the first reactant is made non-reactive in the areas corresponding to the reflective background areas but the portion of reactant corresponding to the light-absorptive image areas of the original remains unchanged. Heating the exposed intermediate against a receptor sheet then causes reaction with the co-reactant and formation of a corresponding image on the receptor.

German Pat. No. 1,263,032 suggests forming image areas on a lithographic plate by utilizing a reducible metal salt as co-reactant, the metal salt being reduced to an oleophilic ink-receptive material. An oxidation means (e.g., dichromate, permanganate or peroxide) is advantageously combined with the metal salt.

A particularly effective method of preparing a high quality lithographic printing plate is disclosed in U.S. Pat. application, Ser. No. 773,358, filed Sept. 19, 1968 now U.S. Pat. No. 3,559,578. The intermediate sheet contains as a co-reactant a light-sensitive substituted alpha-naphthol as defined in U.S. Pat. No. 3,094,619, having directly attached to the hydroxy-substituted aromatic ring a preponderance of electron donor groups, and represented particularly by 4-methoxy-1-naphthol. These normally reactive compounds are desensitized by exposure to ultra-violet radiation or, in the presence of a sensitizer such as erythrosin, by exposure to visible light. The lithographic plate is a dimensionally stable support coated with a preferentially hydrophilic composition, e.g., containing clay or other hydrophilic mineral powder filler in cross-linked or otherwise insolubilized polyvinyl alcohol or other water-insoluble hydrophilic binder. Plasticizers, humectants, coloring materials and other adjuvants or modifiers may be included if desired. An ionic iodide compound is present as co-reactant for the alpha-naphthol.

SUMMARY

The present invention likewise involves the imaging of a lithographic plate containing an ionic iodide co-reactant, by means of an exposed intermediate sheet containing substituted alpha-naphthol co-reactant, but differs from the prior art in a number of significant respects, most particularly inclusion of a second co-reactant with the ionic iodide. Practice of the invention provides a lithographic plate having an improved shelf-life and, which, when imaged, provides a lithomaster having improved image oleophilicity whereby the image density of the printed image is significantly increased.

In accordance with the invention, a co-reactant exceptionally suitable for imaging by an exposed intermediate sheet containing an alpha-naphthol first reactant comprises an ionic chromium compound in conjunction with an ionic iodide compound. The new co-reactant is utilized on a dimensionally stable support coated with a preferentially hydrophilic composition to provide a lithographic plate.

The co-reactant must be present at or near the surface of the hydrophilic coating to insure prompt and efficient reaction with reactants transferred thereto. Thus, the co-reactant may be incorporated within the composition prior to coating, but is more efficiently supplied as a subsequent top-coating applied over the previously coated, dried and insolubilized hydrophilic material. Simple swabbing of the plate surface with a dilute aqueous solution of the co-reactant, using a saturated cotton pledget, is fully effective although usually productive of uneven or incomplete coatings. Use of a coating roller, air knife, or other mechanical device permits more uniform application. The co-reactants may alternatively be added to the hydrophilic coating composition prior to applying the same to the supporting backing. As little as 5 parts by weight of ionic chromium compound per 100 parts by weight of ionic iodide compounds have been found adequate, when carefully applied as a surface coating, to provide improved shelf life and image oleophilicity, although commercial coating practice usually requires somewhat larger amounts. For example, 35 parts by weight of ionic chromium compound per 100 parts of ionic iodide compounds, provides excellent results. On the other hand, good results have been obtained with as much as 50 parts by weight of ionic chromium compound per 100 parts of ionic iodide compound. Much larger amounts of chromium compound provide undesirable background scumming in the imaged plate with a consequent reduction of contrast between the imaged and non-imaged areas.

Typical ionic chromium compounds useful for incorporation with ionic iodides to provide a co-reactant are dichromates such as potassium dichromate, sodium dichromate, cupric dichromate, and ammonium dichromate; and chromates such as sodium chromate, potassium chromate, zinc chromate, and ammonium chromate; chromium salts such as chromic acid, chromic acetate, and chromous chloride; and chromium complexes such as tris (ethylene diamine) chromium III sulfate, and Werner type chromium complexes. It is, of course, possible to utilize a mixture of one or more ionic chromium compounds with a mixture of one or more ionic iodide compounds.

The combination of photoreducible dye and 4-methoxy-1-naphthol or equivalent substituted alpha-naphthol as described in U.S. Pat. No. 3,094,417 provides an intermediate sheet which under reflex exposure to visible light is easily desensitized at light-struck background areas. Heating the thus exposed intermediate in face-to-face contact with a lithographic master prepared with the previously described iodide-chromium co-reactant results in the formation at the plate surface of a faint blue or blue-grey image which is oleophilic and ink-receptive, and which is surprisingly resistant to removal. Lithoplates imaged in the manner described have delivered several thousand excellent copies without any discernible reduction in image quality or density.

In the following illustrative examples all proportions are given in parts by weight unless otherwise indicated.

EXAMPLES 1–5

A hydrophilic dispersion of the following composition was prepared.

| Component | Parts |
|---|---|
| Polyvinyl alcohol | 6.3 |
| Clay | 27.9 |
| Sodium silicate | 8.9 |
| N-butanol | 0.7 |
| Glycerin | 0.3 |
| Glyoxal | 1.9 |

| | |
|---|---|
| Polyoxyethylene aryl ether | 0.12 |
| Tributyl phosphate | 0.73 |
| Water | 53.1 |

Several litho plates were prepared by applying the composition on high wet strength 65-pound litho base paper at a coating weight, after drying, of 22 gms/m$^2$.

The coated litho plates were further coated with solutions of ionic iodide co-reactant containing varying quantities of potassium dichromate as illustrated in Table I to provide a coating weight, after drying of about 0.3 gms/m$^2$. The coating weight is not critical but should preferably be on the order of 0.2 gm./m.$^2$ to provide complete coverage and a smooth surface while avoiding excess curling of the sheet or cracking of the coating.

A commercial light-sensitive intermediate sheet as described in U.S. Pat. No. 3,094,417 containing erythrosin and 4-methoxy-1-naphthol in a polymeric binder on a thin transparent backing was placed against a printed original which was then exposed through the intermediate to uniform illumination from an incandescent tungsten filament source. Exposure was just sufficient to cause complete desensitization at the areas contacting the reflective unprinted background areas. A separate intermediate sheet was prepared, under the same conditions, for use with each of the examples shown in Table I.

A thus exposed intermediate was then placed in face-to-face contact with each of the lithoplate masters prepared as previously described. The composite was heated for a few seconds on a smooth heating platen maintained at about 130° C. On removal of the intermediate, the plate was found to contain a faint blue-grey image corresponding to the printed image of the original.

Each plate was then wet out with acidic aqueous etch solution, placed on a press, and used in printing several thousand excellent copies.

The image density of the copies produced by each of the lithoplates was determined by means of optical density meter, the results being shown in Table I.

The plate containing potassium dichromate and not exposed to the humidity environment provided copies having an image density of 1.26, whereas the corresponding plate containing the potassium dichromate and exposed to the humidity environment provided copies having an image density of 1.23.

EXAMPLE 8

Example 4 was repeated using potassium chromate in place of potassium dichromate. The resultant printed copies had an image density equal to that obtained in Example 4.

EXAMPLE 9

Example 4 was repeated using chromic acetate in place of potassium dichromate. The resultant printed copies had an image density about the same as that obtained in Example 4 and visibly superior to that obtained with the control (Example 1).

EXAMPLE 10

Example 4 was repeated using tris (ethylenediamine) chromium III sulfate in place of potassium dichromate. The resultant printed copies had an image density about the same as that obtained in Example 4 and visibly superior to that obtained with the control (Example 1).

EXAMPLE 11

Example 4 was repeated using N,N-dipropylamine-N,N-dimethyl ammonium iodide in place of the methyl triethyl ammonium iodide and propyl tributyl ammonium iodide. The resultant printed copies had an image density equal to that obtained in Example 4.

I claim:

1. A method of printing comprising: applying a ring-substituted alpha-naphthol first reactant at image-defining areas to a lithoplate master having a preferentially hydrophilic printing layer containing a co-reactant comprising ionic iodide compound and ionic chromium compound, and heating at least said areas, to provide on said master a preferentially oleophilic image-defining pattern: and then printing from said

TABLE I.—LITHOPLATE COATING COMPOSITION

| Example | Potassium dichromate | Methyl triethyl ammonium iodide | Propyl tributyl ammonium iodide | Methanol | N-methyl-glucamine | Propoxylated quaternary ammonium methyl sulfate | Water | Image density |
|---|---|---|---|---|---|---|---|---|
| 1 | ---------- | 0.44 | 0.09 | 1.0 | 0.63 | 0.32 | 97.5 | 0.39 |
| 2 | 0.03 | 0.44 | 0.09 | 1.0 | 0.63 | 0.32 | 97.5 | 0.42 |
| 3 | 0.09 | 0.44 | 0.09 | 1.0 | 0.63 | 0.32 | 97.5 | 0.63 |
| 4 | 0.27 | 0.44 | 0.09 | 1.0 | 0.63 | 0.32 | 97.5 | 1.13 |
| 5 | 0.27 | ---------- | ---------- | 1.0 | 0.63 | 0.32 | 97.5 | (1) |

(1) No image.
1 = Propoquad Ht-12, commercially available from the Armour Chemical Co.

EXAMPLES 6–7

Lithoplate masters were prepared by coating litho base paper as shown and described in Example 1. One plate was coated with the co-reactant composition of Example 1 containing ammonium iodides and no chromium compound. The other plate was coated with the co-reactant of Example 4.

Each master was then subjected to 53° C. dry bulb/51° C. wet bulb humidity environment for 1 hour and thereafter imaged with a light-sensitive intermediate sheet previously exposed to an original document in the manner shown and described in Example 1.

Each plate was wet out with acidic aqueous etch solution, placed on a press, and used in printing several thousand copies. It was found that the plate not containing potassium dichromate and not exposed to the humidity environment provided copies having an image density of 1.22, whereas the companion plate without the potassium dichromate and exposed to the humidity environment for 1 hour provided copies of substantially less image density.

master by the lithographic printing process; said alpha-naphthol being further characterized as having directly attached to the hydroxy-substituted aromatic ring a preponderance of electron donor groups selected from the class consisting of alkyl, aryl, alkoxy, aryloxy, hydroxy and amino groups.

2. Method of claim 1 wherein said alpha-naphthol is applied by transfer from a uniformly coated source sheet held in face-to-face contact with said master.

3. Method of claim 2 wherein said source sheet is heated at least at image-defining areas during transfer of said alpha-naphthol.

4. Method of claim 3 wherein said source sheet is locally heated at image-defining areas by exposure of a differentially radiation-absorbtive imaged original to intense radiation.

5. Method of claim 3 wherein said source sheet is uniformly heated during transfer of said alpha-naphthol and wherein said alpha-naphthol is present on said source sheet only at image-defining areas.

6. Method of claim 5 including the step of preparing the source sheet by reflex exposure of a graphic original to actinic radiation applied through said source sheet, in contact with said original, said source sheet initially having a uniform coating of a said alpha-naphthol which is desensitizable by said radiation.

7. A lithoplate master including a preferentially hydrophilic printing layer containing ionic iodide compound and ionic chromium compound.

8. Lithoplate master of claim 7 wherein said iodide compound and chromium compound comprise an intimate mixture at the surface of said hydrophilic layer.

9. Lithoplate master of claim 8 wherein said chromium compound is a dichromate.

10. Lithoplate master of claim 9 wherein said compound is potassium dichromate.

11. Lithoplate master of claim 7 wherein said ionic chromium compound is present to the extent of about 5 to about 50 parts by weight per 100 parts by weight of ionic iodide.

12. A paper lithoplate master including a paper base and a preferentially hydrophilic coating comprising a hydrophilic water-insoluble binder and a hydrophilic particulate filler, said coating containing ionic iodide compound and ionic chromium compound.

13. Lithoplate master of claim 11 wherein the concentration of said iodide and chromium compounds is highest adjacent the exposed surface of said coating.

14. A lithoplate including a preferentially hydrophilic printing layer having thereon an oleophilic ink-receptive image which comprises the product of a first co-reactant comprising at least one light-sensitive substituted alpha-naphthol and a second co-reactant comprising both ionic iodide compound and ionic chromium compound.

15. The imaged lithoplate of claim 14 wherein said alpha-naphthol is 4-methoxy-1-naphthol.

16. The imaged lithoplate of claim 14 wherein said ionic chromium compound is a dichromate.

17. The imaged lithoplate of claim 15 wherein the ionic iodide is an ammonium iodide and the ionic chromium compound is potassium dichromate.

18. In a method of making a lithoplate master having a hydrophilic printing layer including an ionic iodide compound, the improvement comprising incorporating with said iodide compound, a minor amount of ionic chromium compound.

19. Method of claim 18 wherein said chromium compound is a dichromate.

20. Method of claim 19 wherein said dichromate is potassium dichromate.

* * * * *